D. C. HELLER.
Composition Pavements.
No. 138,023.  Patented April 22, 1873.
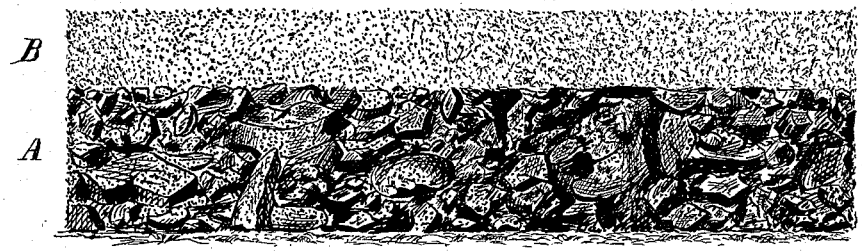
Witnesses  Inventor.
Washington Richards  Daniel C. Heller
H. B. Rhoads
AM. PHOTO-LITHOGRAPHIC CO. N.Y. (OSBORNE'S PROCESS.)

UNITED STATES PATENT OFFICE.

DANIEL C. HELLER, OF READING, PENNSYLVANIA.

IMPROVEMENT IN COMPOSITION PAVEMENTS.

Specification forming part of Letters Patent No. 138,023, dated April 22, 1873; application filed January 3, 1873.

*To all whom it may concern:*

Be it known that I, DANIEL C. HELLER, of Reading, in the county of Berks and State of Pennsylvania, have invented a new and useful Improvement in Composition Pavements; and I do hereby declare that the following is a full, clear, and exact description thereof, which will enable those skilled in the art to make and use the same, reference being had to the accompanying drawing forming part of this specification.

The drawing, consisting of only one figure, represents a vertical section of my improved pavement.

The object of my invention is to furnish a pavement which will be drier, harder, less liable to be injured by heat or frost than any other composition pavement, and which will be perfectly water-tight; and consists of a pavement formed by combining coal tar, sand, lime, broken stone or gravel, dry earth, and coal ashes, or their equivalents, substantially in the manner and proportions hereinafter more fully described.

First, I prepare a mixture for the lower part or base A of the pavement of the following ingredients and in about the following proportions, viz: One-half gallon of coal-tar and one-half bushel of gravel, or their equivalents, and one quart of dry earth. The earth and tar form a paste which adheres to and holds together the broken stone or gravel or other materials with which it may be mixed, and forming a cohesive mass. This mixture I then spread over the ground upon which the pavement is to rest, and press it firmly down and together by passing over it a heavy roller. I then prepare a surface-dressing, B, of the following ingredients and in the following proportions, viz: One-fourth bushel of dry sand, two quarts dry sifted coal-ashes, one quart dry slaked lime, five-eighths gallon of coal-tar, or their equivalents. This I prepare by taking the coal-tar, dry sand, sifted coal-ashes, and lime, or their equivalents, and mixing the whole together. The mixture B is then spread over the prepared base A and pressed down firmly by a roller, as before.

The pavement thus formed will dry almost instantly, will be water-tight, will be less affected by heat and frost, and will be drier and harder than the composition pavements heretofore made.

I claim as new and desire to secure by Letters Patent—

A composition pavement formed by combining coal-tar, lime, sand, dry earth, sifted coal-ashes, and broken stone or gravel, or their equivalents, substantially in the manner herein described, and for the purpose set forth.

DANIEL C. HELLER.

Witnesses:
WASHINGTON RICHARDS,
H. B. RHOADS.